United States Patent
Singh (10) Patent No.: US 11,706,174 B1
(45) Date of Patent: Jul. 18, 2023

(54) IDENTIFYING RESPONSIVENESS OF AN ENTITTY TO MESSAGES VIA AN ONLINE SYSTEM IN A CONTENT ITEM IDENTIFYING THE ENTITY

(71) Applicant: Meta Platforms, Inc., Menlo Park, CA (US)

(72) Inventor: Dheeraj Kumar Singh, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 71 days.

(21) Appl. No.: 16/936,331

(22) Filed: Jul. 22, 2020

(51) Int. Cl.
  *H04L 51/42* (2022.01)
  *H04L 51/216* (2022.01)
  *H04L 51/234* (2022.01)
  *H04L 51/18* (2022.01)

(52) U.S. Cl.
  CPC ............ *H04L 51/18* (2013.01); *H04L 51/216* (2022.05); *H04L 51/234* (2022.05); *H04L 51/42* (2022.05)

(58) Field of Classification Search
  None
  See application file for complete search history.

(56) References Cited

U.S. PATENT DOCUMENTS

| | | | | |
|---|---|---|---|---|
| 2013/0311644 A1* | 11/2013 | Herger | ................... | G06Q 10/00 709/224 |
| 2014/0236663 A1* | 8/2014 | Smith | ................ | G06Q 10/0633 705/7.27 |
| 2014/0278591 A1* | 9/2014 | Blecharczyk | .......... | G06Q 10/06 705/5 |
| 2015/0227299 A1* | 8/2015 | Pourshahid | ........... | G06F 40/106 715/771 |
| 2016/0247093 A1* | 8/2016 | Rachitsky | .............. | G06Q 10/02 |
| 2018/0114252 A1* | 4/2018 | Bhalgat | .............. | G06Q 30/0275 |

OTHER PUBLICATIONS

"How Airbnb Works | Insights into Business & Revenue Model", Singla, Samar, <https://jungleworks.com/airbnb-business-model-revenue-insights/>. (Year: 2017).*

* cited by examiner

*Primary Examiner* — Tonia L Dollinger
*Assistant Examiner* — Jonathan A Sparks
(74) *Attorney, Agent, or Firm* — Fenwick & West LLP (57) ABSTRACT

An online system allows users to exchange messages with other users, including entities such as businesses. The online system determines a metric describing measure of an entity's responsiveness to messages received via the online system based on a number of messages to which the entity responds and times for the entity to respond to messages. The online system displays an indication of the metric for an entity in connection with content identifying the entity. For example, the indication is displayed in conjunction with a content item identifying the entity, such as a content item including a link to initiate communication of a message to the entity.

22 Claims, 3 Drawing Sheets

IDENTIFYING RESPONSIVENESS OF AN ENTITTY TO MESSAGES VIA AN ONLINE SYSTEM IN A CONTENT ITEM IDENTIFYING THE ENTITY

BACKGROUND

This disclosure relates generally to display of content by an application, and more specifically to displaying an indication of an entity's responsiveness to messages via an online system in a content item identifying the entity.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many online systems allow their users to exchange messages via a network and the online system. An online system may provide an application for execution on client devices associated with online system users that allows the users to send messages to other users via the online system and to receive messages from other users via the online system.

Many online systems also commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Certain sponsored content items include a link that, when selected by a user viewing the sponsored content item, present the user with an interface through which the user may transmit a message to a publishing user of a sponsored content item via the online system. The online system may receive compensation from the publishing user when a user selects the link to transmit a message to the publishing user. However, different publishing users have different levels of responsiveness to messages received via the online system. If users transmit a message to a publishing user via a link in a sponsored content item and the publishing user does not subsequently respond or responds after a lengthy delay, users are less likely to subsequently transmit messages to other publishing users via links included in other sponsored content items. This decreases revenue to the online system, while also decreasing interactions by users with content items presented to users via the online system and decreasing communication between users and publishing users caused by user selection of links within sponsored content items from the publishing users.

SUMMARY

An online system allows users to exchange messages with each other. Messages exchanged between users include content comprising text data, image data, video data, audio data, or any combination thereof. Using an application executing on the client device and associated with the online system, a user provides content comprising a message to the online system along with an identifier of a receiving user to receive the message, and the online system communicates the message to the receiving user. Similarly, the user views content included in one or more messages from other users via the application executing on the client device.

The online system receives messages from various sending users to a receiving user and communicates the received messages to the receiving user. Each message received by the online system includes an identifier of a sending user, an identifier of the receiving user, and content. Messages may also include timestamps in various embodiments. In various embodiments, the timestamp identifies a time when the online system received the message, while in other embodiments the timestamp identifies a time when a client device that received the message from the sending user transmitted the message to the online system. The online system stores a received message in association with the sending user and in association with the receiving user and transmits messages received from a sending user to the receiving user.

Subsequently, the online system receives reply messages from the receiving user in response to messages the receiving user received from at least a set of the sending users. Each reply message received by the online system includes an identifier of a sending user, an identifier of the receiving user, and content. Reply messages also include a reply timestamp in various embodiments. In various embodiments, the reply timestamp identifies a time when the online system received the reply message, while in other embodiments the reply timestamp identifies a time when a client device that received the reply message from the receiving user transmitted the message to the online system. The online system stores an indication that a reply message was received, along with the reply timestamp, in association with the receiving user and in association with a sending user. In various embodiments, the online system stores a thread in association with the receiving user and in association with the sending user, with the thread including encrypted messages messages from the sending user to the receiving user and encrypted messages from the receiving user to the sending user. Encrypting messages from the sending users and encrypting messages from the receiving user prevents the online system from accessing content of the messages, while allowing the online system to determine that messages were received by the online system and times when the messages were received by the online system. Alternatively, the online system stores an indication that a message and that a reply message was received, rather than the message and the reply message, allowing the online system to determine an amount of time between the message and the reply message from the stored indications that the message and the reply message were received. Additionally, the online system transmits the reply message to the sending user; for example, the online system transmits the reply message to a client device associated with the sending user for display via an application executing on the client device associated with the sending user.

In various embodiments, the online system evaluates how the receiving user responds to messages from sending users. To evaluate the receiving user's responsiveness to messages from sending users, the online system determines a response time for the receiving user to transmit a reply message to a message from a sending user to the online system. In various embodiments, the online system determines a response time to a message from a sending user by calculating a difference between a timestamp of the message from the sending user and a reply timestamp of a reply message from the receiving user corresponding the message from the sending user. In some embodiments, the online system determines a response time for each message from a sending user for which the online system received a reply message from the receiving user and stores the response time in association with a message from the sending user and the corresponding reply message from the receiving user. In other embodiments, the online system determines an average response time for the responding user by averaging response times for multiple messages from sending users (e.g., averaging response times for messages received from sending users during a specific time interval, average response times for a specific number of messages received from sending messages). When determining the average response time for the receiving user, the online system may specify a maximum value for messages from sending users for which the online system did not receive a reply from the receiving user.

From the determined response times to messages from sending users, the online system determines responsiveness metric for the receiving user. The responsiveness metric has different values corresponding to different amounts of messages from sending users to which the receiving user responded within a threshold response time. Hence, different values of the responsiveness metric correspond to different numbers or percentages of messages from sending users to which the online system received a reply message from the receiving user in less than the threshold response time.

In various embodiments, different rules specify different threshold percentages of messages from sending users for which the online system received a reply message from the receiving user within the threshold response times. Different rules maintained by the online system correlate different ranges of percentages (or numbers) of messages from sending users for which the online system received a reply message within the threshold response time with different values of the responsiveness metric. From the determined response times determined for different messages from sending users, the online system determines a number of messages from sending users for which a determined response time does not exceed the threshold response time and determines a ratio of the determined number of messages from sending users for which a determined response time does not exceed the threshold response time to a total number of messages to the receiving user received from sending users. The online system applies the one or more maintained rules to the determined ratio to determine a value of the responsiveness metric for the receiving user.

For example, a rule maintained by the online system associates a maximum value of the responsiveness metric with a maximum amount (e.g., maximum percentage) of messages from sending users for which the online system received a reply message from the receiving user within the threshold response time. In response to a ratio of a number of messages from sending users for which a determined response time does not exceed the threshold response time to a total number of messages to the receiving user received from sending users equaling or exceeding the maximum amount, the online system determines the maximum value of the responsiveness metric for the receiving user. Another rule maintained by the online system associates a minimum value of the responsiveness metric with a minimum amount (e.g., maximum percentage) of messages from sending users for which the online system received a reply message from the receiving user within the threshold response time. Hence, the online system determines the minimum value of the responsiveness metric for the receiving user in response to a ratio of the number of messages from sending users for which a determined response time does not exceed the threshold response time to a total number of messages to the receiving user received from sending users being less than the minimum amount. Another rule maintained by the online system determines an intermediate value for the responsiveness metric for the receiving user in response to the ratio of the number of messages from sending users for which a determined response time does not exceed the threshold response time to a total number of messages to the receiving user received from sending users being less than the maximum amount and equaling or exceeding the minimum amount. In other embodiments, different rules maintained by the online system associate different values of the responsiveness metric for the receiving user with different ranges of amounts (e.g., percentages) of messages from sending users for which the online system received a reply message from the receiving user within the threshold response time; hence, the online system determines a value for the responsiveness metric for the receiving user associated with a range of amounts of messages from sending users for which the online system received reply message from the receiving user within the threshold response time that includes the ratio of the number of messages from sending users for which a determined response time does not exceed the threshold response time to a total number of messages to the receiving user received from sending users. The online system stores the value of the responsiveness metric determined for the receiving user in a user profile maintained for the receiving user by the online system.

The online system receives a content item from the receiving user including a link that, when selected by a user, displays a messaging interface configured to receive one or more messages for the receiving user from the user. Hence, when a user viewing the content item (also referred to as a "viewing user") selects the link via a client device, the client device presents a messaging interface allowing the viewing user to enter a message that is transmitted to the receiving user via the online system. For example, selecting the link causes the client device to execute an application associated with the online system that receive one or more messages from the viewing user and transmits the one or more messages to the online system, which transmits the one or more messages to the receiving user. In various embodiments, the content item from the receiving user is a sponsored content item, for which the online system receives compensation from the receiving user when users select the link included in the content item from the receiving user. The content item also includes information identifying the receiving user, such as an image or a name of the receiving user, and may include additional content for display to users. The online system may receive the content item from the receiving user before determining the responsiveness metric for the receiving user or may receive the content item after determining the responsiveness metric for the receiving user.

When the online system identifies an opportunity to present content to a viewing user, the online system includes the content item received from the receiving user and other content items in one or more selection processes. In response to one or more of the selection processes selecting the content item from the receiving user for presentation to the viewing user, the online system displays the content item from the receiving user to the viewing user. For example, the online system includes the content item from the receiving user in a feed of content the online system generates for the viewing user. As another example, the online system includes the content item from the receiving user in an interface including the feed of content generated for the viewing user and other content (e.g., the content item from the receiving user is displayed adjacent to the feed of content).

When displaying the content item from the receiving user to the viewing user, the online system also displays an indication of the responsiveness metric for the receiving user in conjunction with the content item. The online system displays different visual indications of the responsiveness metric for different values of the responsiveness metric. In various embodiments, the online system displays the visual indicator with different colors corresponding to different values of the responsiveness metric. Alternatively, the online system displays different visual indicators for different values of the responsiveness metric. In other embodiments, the online system displays a visual indicator for values of the responsiveness metric equaling or exceeding a threshold value, but does not display a visual indicator for values of the responsiveness metric less than the threshold value.

By displaying the visual indicator of the receiving user's response time in conjunction with the content item including the link that, when selected, generates an interface for the viewing user to provide a message to the receiving user, the online system provides the viewing user with additional incentive to select the link in the content item. For example, displaying a visual indicator that the responding user has a value for the responsiveness metric indicating that the responding user is likely to respond to messages in less than a threshold response time increases a likelihood of the viewing user selecting the link in the content item to generate a message for the receiving user. Thus, displaying the visual indicator of the receiving user's response time in conjunction with the content item increases a likelihood of users to whom the content item was displayed interacting with the sponsored content item and further interacting with the receiving user via the online system, which increases overall user interaction with the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
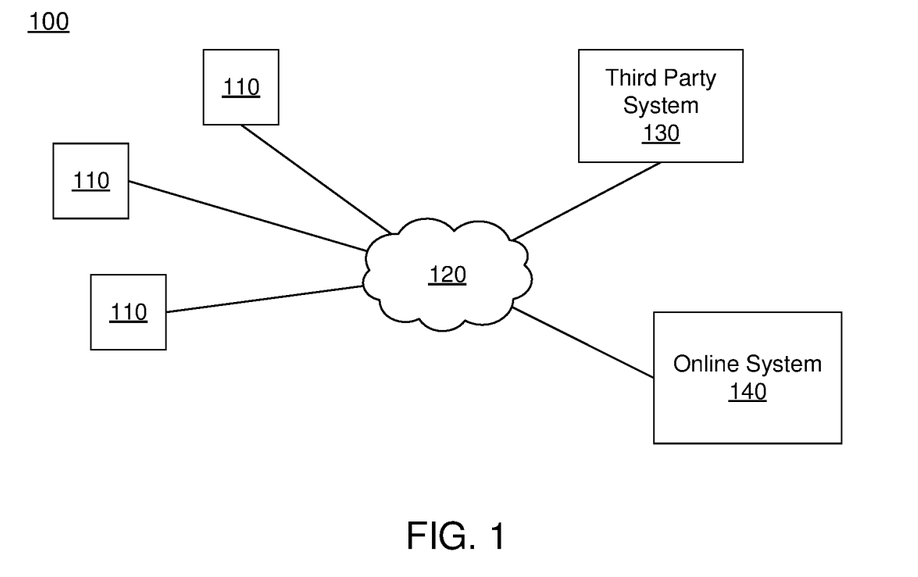
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

A client device 110 executes an application associated with the online system 140 that transmits messages from a user of the client device 110 to one or more receiving users of the online system 140 via the network 120 and the online system 140. The application also receives messages from other users of the online system 140 via the network 120 and displays the received messages to the user via a display device of the client device 110. To allow the user to more easily transmit and receive messages, the application groups messages into different threads, with a thread including messages associated with a common receiving user or with a common group of receiving users. Hence, different threads include messages associated with different receiving users. The application identifies different threads in different locations of an interface. For example, the application displays information identifying receiving users associated with different threads in different locations of the interface. The application also displays one or more sponsored content items in the interface along with information identifying threads.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130.

Figure 2:
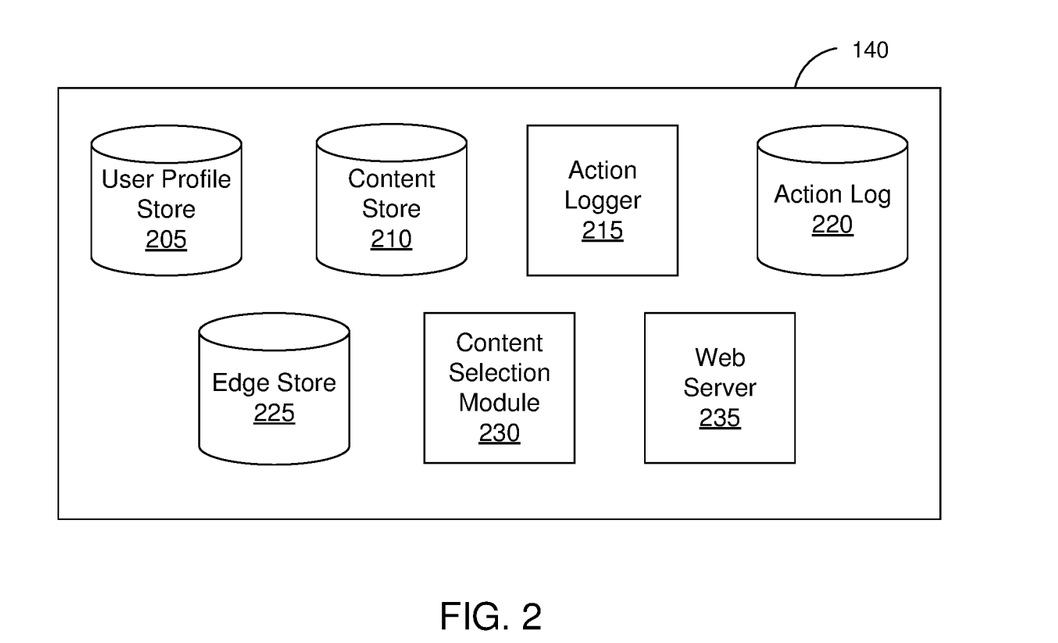
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and a bid amount. The content is text, image, audio, video, or any other suitable data presented to a user. In various embodiments, the content also specifies a page of content. For example, a sponsored content item includes a landing page specifying a network address of a page of content to which a user is directed when the content item is accessed. In some embodiments, a sponsored content item includes a link that, when selected by a user to whom the sponsored content item is displayed, performs an action. For example, a sponsored content item includes a link that, when selected by a user to whom the sponsored content item is displayed, launches an interface or an application through which the user enters and transmits a message to another user associated with the sponsored content item via the online system 140. The bid amount is included in a sponsored content item by a user and is used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount included in a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

As further described below in conjunction with FIG. 3, the content selection module 230 determines a responsiveness metric for a user, such as a business or another entity, based on response times of the user to messages that the user receives from other users. For example, the content selection module 230 determines a response time of the user to each of a set of messages the user received from other users (e.g., messages the user received during a specific time interval) based on a timestamp of a message the user received and a timestamp of a reply message from the user to the received message. Based on response times of the user to various messages from other users, the content selection module 230 determines a value of the responsiveness metric of the user by comparing the response times to various messages to a threshold response time. As further described below in conjunction with FIG. 3, the content selection module 230 determines the value of the responsiveness metric based on a percentage (or other amount) of messages the user received to which the user provided a reply message in less than the threshold response time. If the content selection module 230 selects a content item identifying the user that includes a link that, when selected by another user, initiates an interface for the other user to transmit a message to the user, the content selection module 230 includes a visual indication of the value of the responsiveness metric of the user in conjunction with the content item, as further described below in conjunction with FIGS. 3 and 4.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
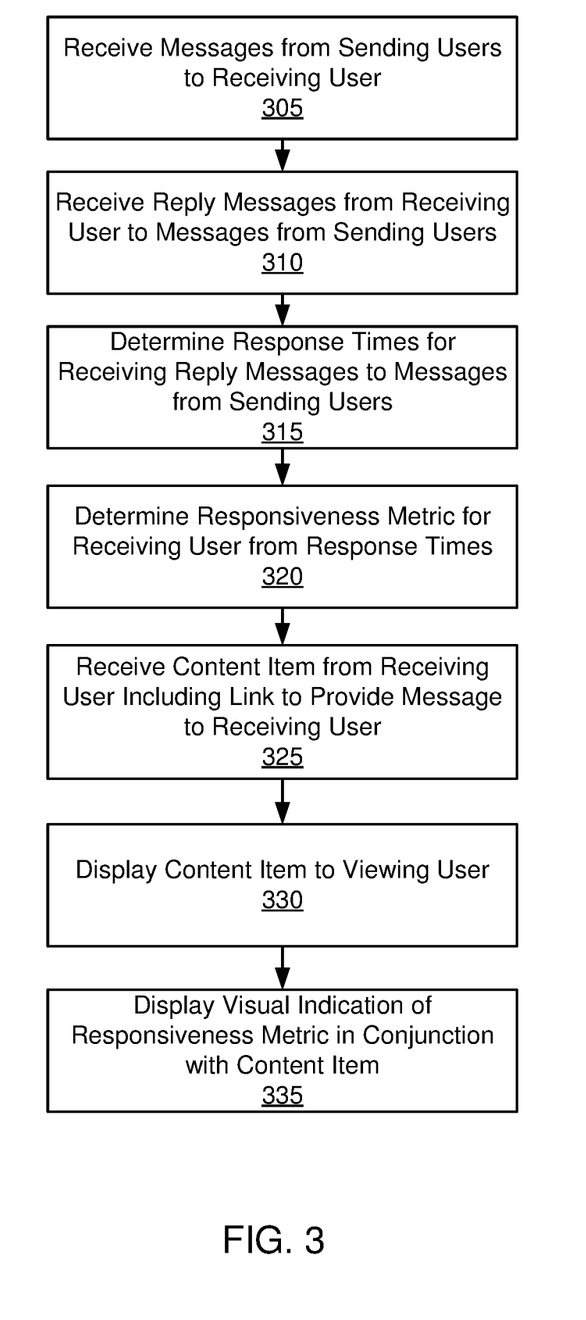
FIG. 3 is a flowchart of a method for displaying an indication of a receiving user's responsiveness to messages received via an online system in conjunction with a content item identifying the receiving user, in accordance with an embodiment.

Displaying an Indication of a Receiving User's Responsiveness to Messages Received Via an Online System FIG. 3 is a flowchart of one embodiment of a method for displaying an indication of a receiving user's responsiveness to messages received via an online system 140 in conjunction with a content item identifying the receiving user. In various embodiments, the method may include different or additional steps than those described in conjunction with FIG. 3. Additionally, in some embodiments, the method may perform the steps in different orders than the order described in conjunction with FIG. 3.

An online system 140, as further described above in conjunction with FIG. 2, allows users to exchange messages with each other. The online system 140 allows a user to transmit a message including content comprising text data, image data, video data, audio data, or any combination thereof to another user via the online system 140. Similarly, the online system 140 allows the other user to transmit a message to the user via the online system 140. Using an application executing on the client device 110 and associated with the online system 140, a user provides content comprising a message to the online system 140 along with an identifier of a receiving user to receive the message, and the online system 140 communicates the message to the receiving user. Similarly, the user views content included in one or more messages from other users via the application.

The online system 140 receives 305 messages from various sending users to a receiving user and communicates the received messages to the receiving user. Each message received 305 by the online system 140 includes an identifier of a sending user, an identifier of the receiving user, a timestamp, and content. In various embodiments, the timestamp identifies a time when the online system 140 received the message, while in other embodiments the timestamp identifies a time when a client device 110 that received the message from the sending user transmitted the message to the online system 140. The online system 140 stores a received 305 message in association with the sending user and in association with the receiving user. Additionally, the online system 140 stores a time for a message in association with the sending user and in association with the receiving user. In some embodiments, the stored time is a timestamp included in the message, while in other embodiments the online system 140 stores a timer in association with the message and starts the timer when the message is received 305.

The online system 140 transmits messages received 305 from a sending user to the receiving user. For example, the online system 140 transmits a message received 305 from a sending user to client devices 110 associated with the receiving user, and a client device 110 displays a message from the sending user to the receiving user via an application associated with the online system 140. In various embodiments, the receiving user is an entity, such as a business or another type of organization. Subsequently, the online system 140 receives 310 reply messages from the receiving user in response to messages the receiving user received from at least a set of the sending users. Each reply message received 310 by the online system 140 includes an identifier of a sending user, an identifier of the receiving user, and content. In various embodiments, a reply message includes a reply timestamp identifying a time when the online system 140 received 310 the reply message, while in other embodiments the reply timestamp identifies a time when a client device 110 that received the reply message from the receiving user transmitted the message to the online system 140. The online system stores 140 a time for a reply message in association with the reply message. Additionally, the online system 140 stores a time for a reply message in association with the receiving user and in association with the sending user. In some embodiments, the stored time is a reply timestamp included in the reply message, while in other embodiments the online system 140 stops a timer associated with the message from the sending user in response to receiving 310 the reply message to the message.

The online system 140 stores an indication a reply message was received in association with the receiving user and in association with a sending user. In various embodiments, the online system 140 stores a thread in association with the receiving user and in association with the sending user, with the thread including encrypted messages from the sending user to the receiving user and encrypted messages from the receiving user to the sending user. Encrypting messages from the sending users and encrypting messages from the receiving user prevents the online system 140 from accessing content of the messages, while allowing the online system 140 to determine that messages were received by the online system 140 and times when the messages were received by the online system 140.

In various embodiments, the online system 140 evaluates how the receiving user responds to messages from sending users. To evaluate the receiving user's responsiveness to messages from sending users, the online system 140 determines 315 a response time for the receiving user to transmit a reply message to a message from a sending user to the online system 140 from a stored time for the message from the sending user and a stored time for the reply message to the message. In various embodiments, the online system 140 determines 315 a response time to a message from a sending user by calculating a difference between a timestamp of the message from the sending user and a reply timestamp of a reply message from the receiving user corresponding the message from the sending user. In some embodiments, the online system 140 determines 315 a response time for each message from a sending user for which the online system 140 received 310 a reply message from the receiving user and stores the response time in association with a message from the sending user and the corresponding reply message from the receiving user. In other embodiments, the online system 140 determines 315 an average response time for the responding user by averaging response times for multiple messages from sending users (e.g., averaging response times for messages received from sending users during a specific time interval, average response times for a specific number of messages received from sending messages). When determining 315 the average response time for the receiving user, the online system 140 may specify a maximum value for messages from sending users for which the online system 140 did not receive 310 a reply from the receiving user.

From the determined response times to messages from sending users, the online system 140 determines 320 a responsiveness metric for the receiving user. The responsiveness metric has different values corresponding to different amounts of messages from sending users to which the receiving user responded within a threshold response time. Hence, different values of the responsiveness metric correspond to different numbers or percentages of messages from sending users to which the online system 140 received 310 a reply message from the receiving user in less than the threshold response time. The threshold response time may be determined by one or more settings of the online system 140. In some embodiments, an administrator of the online system 140 specifies the threshold response time. Alternatively, the online system 140 determines the threshold response time by applying one or more machine learned models to prior characteristics of sending users from whom messages to the receiving user, or to other receiving users, were received, subsequent messages between the sending users and the receiving users, and other interactions between the sending users and the receiving users. In other embodiments, the receiving user provides the threshold response time to the online system 140, which stores the threshold response time in association with the receiving user (e.g., in a user profile of the receiving user).

In various embodiments, different rules specify different threshold percentages of messages from sending users for which the online system 140 received 310 a reply message from the receiving user within the threshold response times; however, in other embodiments, different rules specify different numbers of messages from sending users for which the online system 140 received 310 a reply message from the receiving user in less than the threshold response time. Different rules maintained by the online system 140 correlate different ranges of percentages (or numbers) of messages from sending users for which the online system 140 received 310 a reply message within the threshold response time with different values of the responsiveness metric. From the determined response times determined 315 for different messages from sending users, the online system 140 determines a number of messages from sending users for which a determined response time does not exceed the threshold response time and determines a ratio of the determined number of messages from sending users for which a determined response time does not exceed the threshold response time to a total number of messages to the receiving user received 305 from sending users. The online system 140 applies the one or more maintained rules to the determined ratio to determine 320 a value of the responsiveness metric for the receiving user.

For example, a rule maintained by the online system 140 associates a maximum value of the responsiveness metric with a maximum amount (e.g., maximum percentage) of messages from sending users for which the online system 140 received 310 a reply message from the receiving user within the threshold response time. In response to a ratio of a number of messages from sending users for which a determined response time does not exceed the threshold response time to a total number of messages to the receiving user received 305 from sending users equaling or exceeding the maximum amount, the online system 140 determines 320 the maximum value of the responsiveness metric for the receiving user. Another rule maintained by the online system 140 associates a minimum value of the responsiveness metric with a minimum amount (e.g., maximum percentage) of messages from sending users for which the online system 140 received 310 a reply message from the receiving user within the threshold response time. Hence, the online system 140 determines 320 the minimum value of the responsiveness metric for the receiving user in response to a ratio of the number of messages from sending users for which a determined response time does not exceed the threshold response time to a total number of messages to the receiving user received 305 from sending users being less than the minimum amount. Another rule maintained by the online system 140 determines 320 an intermediate value for the responsiveness metric for the receiving user in response to the ratio of the number of messages from sending users for which a determined response time does not exceed the threshold response time to a total number of messages to the receiving user received 305 from sending users being less than the maximum amount and equaling or exceeding the minimum amount. In other embodiments, different rules maintained by the online system 140 associate different values of the responsiveness metric for the receiving user with different ranges of amounts (e.g., percentages) of messages from sending users for which the online system 140 received 310 a reply message from the receiving user within the threshold response time; hence, the online system 140 determines 320 a value for the responsiveness metric for the receiving user associated with a range of amounts of messages from sending users for which the online system 140 received 310 a reply message from the receiving user within the threshold response time that includes the ratio of the number of messages from sending users for which a determined response time does not exceed the threshold response time to a total number of messages to the receiving user received 305 from sending users. The online system 140 stores the value of the responsiveness metric determined 320 for the receiving user in a user profile maintained for the receiving user by the online system 140 or otherwise stores the value of the responsiveness metric in association with the receiving user.

Additionally, the online system 140 receives 325 a content item from the receiving user including a link that, when selected by a user, displays a messaging interface configured to receive one or more messages for the receiving user from the user. Hence, when a user viewing the content item (also referred to as a "viewing user") selects the link via a client device 110, the client device 110 presents a messaging interface allowing the viewing user to enter a message that is transmitted to the receiving user via the online system 140. For example, selecting the link causes the client device 110 to execute an application associated with the online system 140 that receive one or more messages from the viewing user and transmits the one or more messages to the online system 140, which transmits the one or more messages to the receiving user 140. In various embodiments, the content item from the receiving user is a sponsored content item, as further described above in conjunction with FIG. 2, for which the online system 140 receives compensation from the receiving user when users select the link included in the content item from the receiving user. The content item also includes information identifying the receiving user, such as an image or a name of the receiving user, and may include additional content for display to users. The online system 140 may receive 325 the content item before determining 320 the responsiveness metric for the receiving user or may receive 325 the content item after determining 320 the responsiveness metric for the receiving user in various embodiments.

As further described above in conjunction with FIG. 2, when the online system 140 identifies an opportunity to present content to a viewing user, the online system 140 includes the content item received 325 from the receiving user and other content items in one or more selection processes. In response to one or more of the selection processes selecting the content item from the receiving user for presentation to the viewing user, the online system 140 displays 330 the content item from the receiving user to the viewing user. For example, the online system 140 includes the content item from the receiving user in a feed of content the online system 140 generates for the viewing user. As another example, the online system 140 includes the content item from the receiving user in an interface including the feed of content generated for the viewing user and other content (e.g., the content item from the receiving user is displayed 330 adjacent to the feed of content).

When displaying 330 the content item from the receiving user to the viewing user, the online system 140 also displays 335 an indication of the responsiveness metric for the receiving user in conjunction with the content item. The online system 140 displays 335 different visual indications of the responsiveness metric for different values of the responsiveness metric. In various embodiments, the online system 140 displays 335 the indication of the responsiveness metric in the content item from the receiving user. For example, the online system 140 displays 335 a visual indication of a value of the responsiveness metric in conjunction with a name or an image of the receiving user included in the content item from the receiving user. In various embodiments, the online system 140 displays 335 a visual indicator that has a different color for different values of the responsiveness metric. For example, the visual indicator has a first color corresponding to a maximum value of the responsiveness metric, has a second color corresponding to an intermediate value of the responsiveness metric, and has a third color corresponding to a minimum value of the responsiveness metric. In another example, the online system 140 displays 335 different visual indicators corresponding to different ranges of values of the responsiveness metric. For example, a first visual indicator corresponds to a maximum value of the responsiveness metric, while a second visual indicator corresponds to an intermediate value of the responsiveness metric, and a third visual indicator corresponds to a minimum value of the responsiveness metric. In other embodiments, different visual indicators are displayed 335 for different ranges of values of the responsiveness metric. Alternatively, the online system 140 displays 335 a visual indicator of the responsiveness metric in conjunction with the content item if a value of the responsiveness metric equals or exceeds a threshold value, but does not display the visual indicator if the value of the responsiveness metric is less than the threshold value.

Figure 4:
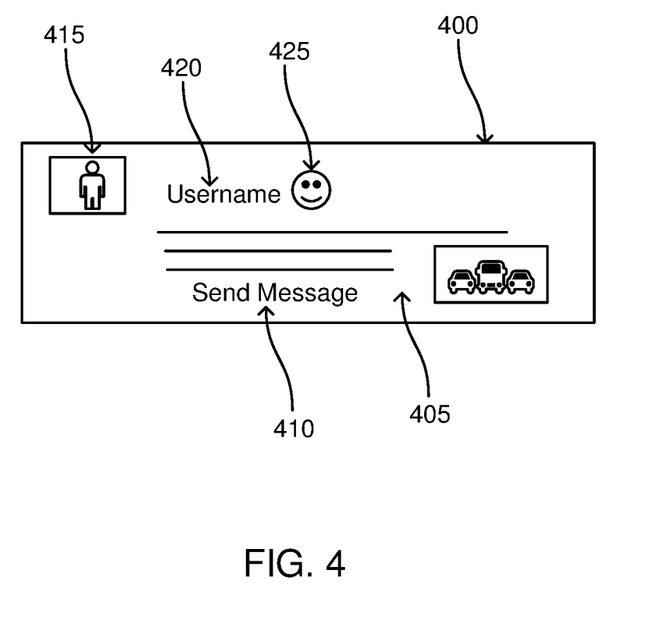
FIG. 4 is an example of an indication of a receiving user's responsiveness to messages via the online system displayed in conjunction with a content item identifying the receiving user, in accordance with an embodiment.

FIG. 4 is an example of an indication of a receiving user's responsiveness to messages via the online system displayed in conjunction with a content item identifying the receiving user. In the example of FIG. 4, a content item 400 includes content 405 for display to a viewing user, such as text, image, audio, or video data, and includes a link 410. When the viewing user selects the link 410, a client device 110 displaying the content item 400 generates an interface for the viewing user to create and to transmit a message to the receiving user via an online system 140. For example, the client device 110 executes a messaging application associated with the online system 140 in response to the viewing user selecting the link 410.

Additionally, the content item 400 includes information identifying the receiving user. In the example shown by FIG. 4, the content item 400 includes an image 415 that the online system 140 maintains for the receiving user and a username 420 that the online system 140 maintains for the receiving user. To encourage the viewing user to select the link 410, when the content item 400 is displayed to the viewing user, the online system 140 also displays a visual indicator 425 of the receiving user's responsiveness to messages received via the online system 140. As further described above in conjunction with FIG. 3, the online system 140 determines a responsiveness metric for the receiving user based on lengths of time for the receiving user to respond to previously received messages from other users. Based on a percentage of previously received messages from other users to which the receiving user replied in lengths of time less than or equal to a threshold response time, the online system 140 determines a value of the responsiveness metric for the receiving user, and displays a visual indicator 425 in conjunction with the content item 400 based on the value of the responsiveness metric. While FIG. 4 shows the visual indicator 425 displayed proximate to the username 420 of the receiving user, in other embodiments the visual indicator 425 is displayed proximate to the image 415 of the receiving user or is displayed in another location within the content item 400.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, messages from sending users of the online system to a receiving user of the online system;
   storing times for the messages;
   receiving, at the online system, reply messages from the receiving user in response to messages from at least a set of the sending users;
   storing times for the reply messages from the receiving user;
   determining one or more response times to messages from one or more sending users for which the online system received a reply message based on stored times for the messages for which the online system received the reply message and stored times for corresponding reply messages;
   determining a responsiveness metric for the receiving user from the determined response times;
   receiving a content item from the receiving user at the online system, the content item including a link that, when selected, displays a messaging interface configured to receive one or more messages for the receiving user, wherein the content item further includes a bid amount specifying an amount of compensation the online system receives from the receiving user in response to the viewing user selecting the link included in the content item;
   displaying the content item to a viewing user;
   displaying a visual indication of the responsiveness metric for the receiving user in conjunction with the content item;
   receiving a second content item from the receiving user at the online system;
   responsive to determining that the responsiveness metric for the receiving user is equal to or exceeds a threshold value, displaying a visual indication in the second content item; and
   responsive to determining that the responsiveness metric for the receiving user is less than the threshold value, withholding display of the visual indication in the second content item.

2. The method of claim 1, wherein determining the responsiveness metric for the receiving user from the determined response times comprises:
   retrieving a threshold response time maintained by the online system;
   determining a ratio of a number of messages from sending users having a determined response time that does not exceed the threshold response time to a total number of messages from sending users to the receiving user;
   determining a maximum value for the responsiveness metric in response to the determined ratio equaling or exceeding a maximum amount.

3. The method of claim 2, wherein determining the responsiveness metric for the receiving user from the determined response times further comprises:
   determining a minimum value for the responsiveness metric in response to the determined ratio being less than a minimum amount.

4. The method of claim 3, wherein determining the responsiveness metric for the receiving user from the determined response times further comprises:
   determining an intermediate value for the responsiveness metric in response to the determined ratio being less than the maximum amount and equaling or exceeding the minimum amount.

5. The method of claim 1, wherein displaying the visual indication of the responsiveness metric for the receiving user in conjunction with the content item comprises:
   displaying the visual indication of a value of the responsiveness metric in conjunction with a portion of the content item identifying the receiving user.

6. The method of claim 5, wherein the visual indication has a different color for different values of the responsiveness metric.

7. The method of claim 1, wherein displaying the visual indication of the responsiveness metric for the receiving user in conjunction with the content item comprises:
   displaying different visual indicators corresponding to different values of the responsiveness metric for the receiving user.

8. The method of claim 1, wherein the receiving user comprises a business.

9. The method of claim 1, wherein a time for a message comprises a timestamp included in the message.

10. The method of claim 9, wherein a time for a reply message comprises a reply timestamp included in the reply message.

11. The method of claim 1, wherein storing times for the messages further comprises storing indications that the messages were received without storing contents of the messages, and wherein storing times for the reply messages from the receiving user further comprises storing indications that the reply messages were received without storing contents of the reply messages.

12. A computer program product comprising a non-transitory computer readable storage medium having instructions encoded thereon that, when executed by a processor, cause the processor to:
 receive, at an online system, messages from sending users of the online system to a receiving user of the online system;
 storing times for the messages;
 receive, at the online system, reply messages from the receiving user in response to messages from at least a set of the sending users;
 storing times for the reply messages from the receiving user;
 determine one or more response times to messages from one or more sending users for which the online system received a reply message based on stored times for the messages for which the online system received the reply message and stored times for corresponding reply messages;
 determine a responsiveness metric for the receiving user from the determined response times;
 receive a content item from the receiving user at the online system, the content item including a link that, when selected, displays a messaging interface configured to receive one or more messages for the receiving user, wherein the content item further includes a bid amount specifying an amount of compensation the online system receives from the receiving user in response to the viewing user selecting the link included in the content item;
 display the content item to a viewing user;
 display a visual indication of the responsiveness metric for the receiving user in conjunction with the content item;
 receive a second content item from the receiving user at the online system;
 responsive to determining that the responsiveness metric for the receiving user is equal to or exceeds a threshold value, display a visual indication in the second content item; and
 responsive to determining that the responsiveness metric for the receiving user is less than the threshold value, withhold display of the visual indication in the second content item.

13. The computer program product of claim 12, wherein determine the responsiveness metric for the receiving user from the determined response times comprises:
 retrieve a threshold response time maintained by the online system;
 determine a ratio of a number of messages from sending users having a determined response time that does not exceed the threshold response time to a total number of messages from sending users to the receiving user;
 determine a maximum value for the responsiveness metric in response to the determined ratio equaling or exceeding a maximum amount.

14. The computer program product of claim 13, wherein determine the responsiveness metric for the receiving user from the determined response times further comprises:
 determine a minimum value for the responsiveness metric in response to the determined ratio being less than a minimum amount.

15. The computer program product of claim 14, wherein determine the responsiveness metric for the receiving user from the determined response times further comprises:
 determine an intermediate value for the responsiveness metric in response to the determined ratio being less than the maximum amount and equaling or exceeding the minimum amount.

16. The computer program product of claim 12, wherein display the visual indication of the responsiveness metric for the receiving user in conjunction with the content item comprises:
 display the visual indication of a value of the responsiveness metric in conjunction with a portion of the content item identifying the receiving user.

17. The computer program product of claim 16, wherein the visual indication has a different color for different values of the responsiveness metric.

18. The computer program product of claim 12, wherein display the visual indication of the responsiveness metric for the receiving user in conjunction with the content item comprises:
 display different visual indicators corresponding to different values of the responsiveness metric for the receiving user.

19. The computer program product of claim 12, wherein the receiving user comprises a business.

20. The computer program product 13, wherein a time for a message comprises a timestamp included in the message.

21. The computer program product of claim 20, wherein a time for a reply message comprises a reply timestamp included in the reply message.

22. The computer program product of claim 12, wherein the instructions further cause the processor to store indications that the messages were received without storing contents of the messages, and to store indications that the reply messages were received without storing contents of the reply messages.

* * * * *

UNITED STATES PATENT AND TRADEMARK OFFICE
CERTIFICATE OF CORRECTION

| | | |
|---|---|---|
| PATENT NO. | : 11,706,174 B1 | Page 1 of 1 |
| APPLICATION NO. | : 16/936331 | |
| DATED | : July 18, 2023 | |
| INVENTOR(S) | : Dheeraj Kumar Singh | |

It is certified that error appears in the above-identified patent and that said Letters Patent is hereby corrected as shown below:

On the Title Page

In item (54) and In the Specification, Column 1, Line 2, in title, delete "ENTITTY" and insert -- ENTITY --, therefor.

In the Claims

In Column 22, Claim 20, Line 44, delete "program product 13," and insert -- program product of claim 12, --, therefor.

Signed and Sealed this
Tenth Day of October, 2023

Katherine Kelly Vidal
*Director of the United States Patent and Trademark Office*